United States Patent [19]

Tamba et al.

[11] Patent Number: 4,561,386

[45] Date of Patent: Dec. 31, 1985

[54] FAN HOUSING FOR ENGINE

[75] Inventors: Shinichi Tamba; Noboru Fukui, both of Kakogawa, Japan

[73] Assignee: Kawasaki Jukogyo Kabushiki Kaisha, Hyogo, Japan

[21] Appl. No.: 683,504

[22] Filed: Dec. 19, 1984

[30] Foreign Application Priority Data

Dec. 20, 1983 [JP] Japan ............................... 58-241707

[51] Int. Cl.[4] ......................... F01P 1/02; A01D 53/08

[52] U.S. Cl. ................................ 123/41.7; 123/195 C

[58] Field of Search ............... 123/41.58, 41.62, 41.65, 123/41.66, 41.69, 41.7, 195 C, 198 E; 56/16.7, 16.8, 12.8, 17.5, 320.1

[56] References Cited

U.S. PATENT DOCUMENTS 3,259,752 7/1966 Honda ............................ 123/41.62
3,514,930 6/1970 Griffiths ............................. 56/12.8
4,510,739 4/1985 Diuhosch ......................... 123/195 C

FOREIGN PATENT DOCUMENTS 247189 3/1963 Australia ............................ 123/41.7
2519842 11/1976 Fed. Rep. of Germany ..... 56/320.1

*Primary Examiner*—William A. Cuchlinski, Jr.

[57] ABSTRACT

A housing for an engine cooling fan, which is made up of a double wall construction with a cooling air intake passage arranged at the center and with the space in the double wall construction serving as a fuel tank. Extending in the direction of an engine output shaft, the cooling air intake passage is made up of a nearly cylindrical wall combined to the housing outer and inner walls at both ends, wherein a recoil starter is directly installed concentrically with the engine output shaft.

2 Claims, 3 Drawing Figures

FAN HOUSING FOR ENGINE

BACKGROUND OF THE INVENTION

This invention relates to a housing for an engine cooling fan mounted on an engine output shaft.

Aiming to give a compact shape to the whole engine and prevent heating fuel by means of air cooling, the prior art is well known where a part or the whole of a housing for an engine cooling fan mounted on an engine output shaft is made up of a double wall construction, with the double wall serving as a fuel tank.

By the way, installation of a recoil starter directly on the fan housing offers advantages of providing extremely simple start operation in comparison with the rope-wrapping type starting employed in the conventional integrated fuel tank, and of eliminating the need for a starter case. However, the double wall fan housing, which is largely made of synthetic resin to double as said fuel tank, has the potential to crack or deform, resulting in a cause of oil leakage, when a recoil starter subject to vigorous external force is directly installed on the fan housing. Therefore, there have been cases where a ropewrapping-type starter is installed on the fan housing, but no cases of direct recoil starter installation.

SUMMARY OF THE INVENTION

To solve aforesaid drawbacks of the prior art for direct installation of a recoil starter on a double-wall cooling fan housing doubling as a fuel tank gave rise to the present invention.

Thus it can be said that the purpose and object of this invention is to provide a double-wall fan housing which is simple in configuration, and immune against direct installation of a recoil starter.

To achieve aforesaid purpose, a fan housing according to this invention is characterized by installing a nearly cylindrical cooling air passage in the direction of the engine crankshaft at the center of the double wall fan housing together with a recoil starter at the center of said passage.

The cylindrical configuration of the cooling air passage, which is formed throughout the double wall and houses a recoil starter, provides a strength enough to directly install a recoil starter subject to vigorous external force, even if the fan housing is made up of synthetic resin, as well as permits a considerable length of the recoil starter to be accommodated, thereby eliminating the need for an additional installation of a starter case.

DETAIL DESCRIPTION OF THE PREFERRED EMBODIMENT

Figure 1:
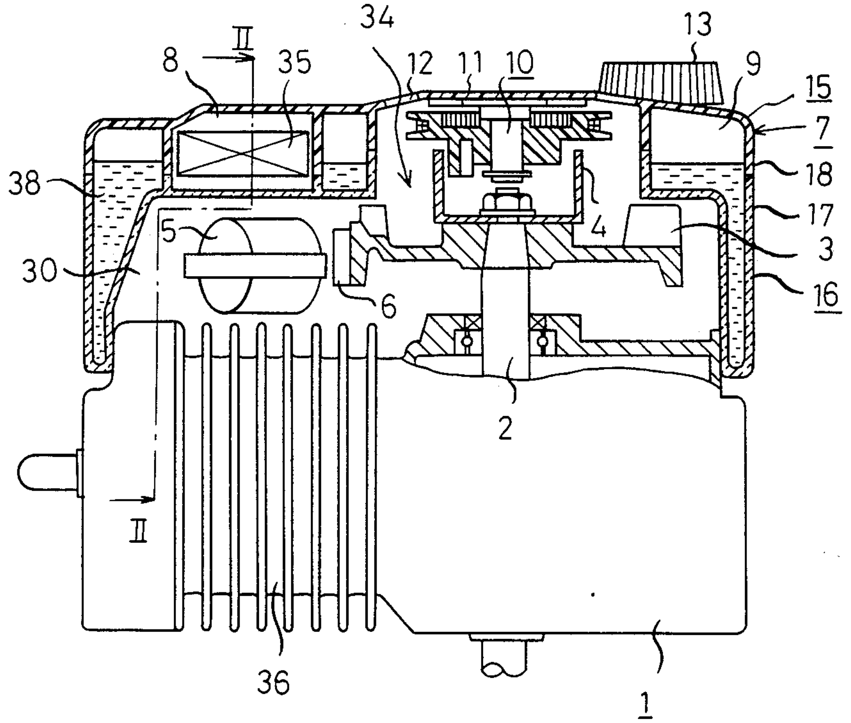
FIG. 1 is a side sectional view showing an embodiment of a fan housing according to the invention along with an engine body, a cooling fan and a recoil starter.

Referring now in detail to the illustrative embodiment depicted in FIG. 1, there is shown a side sectional view of a general-purpose vertical engine according to the invention along with an engine body, cooling fan and recoil starter. Numeral 1 is an engine body, and Numeral 2 is a crankshaft, on the projecting end of which are secured an engine cooling fan and a driven pulley, arranged above the engine body 1. Numeral 5 is an ignition coil, placed opposed to a permanent magnet installed in the vicinity of the engine cooling fan 3.

Numeral 7 is a synthetic resin fan housing, which covers the engine cooling fan 3 together with said driven pulley 4 and the ignition coil 4. The fan housing 7 is of a double wall construction, whose central portion forms a cylindrical wall (serving as a nearly cylindrical cooling air passage) above the cooling fan 3 throughout the length of the double wall. The lower side of the cooling air passage is full opened, and the upper side is covered with a starter case 11, which is integrated with the outer wall of the fan housing, having a number of engine cooling air intake openings 12. At the inner center of the starter case 11, a recoil starter 10 driving the said driven pulley 4 is arranged concentrically with the engine crankshaft 2. A part of the hollow space between the double walls surrounding the cooling air passage 50 serves as an air cleaner chamber and the rest as a fuel tank 9 storing fuel 38. Numeral 13 is a tank cap.

In case of the illustrative embodiment, the fan housing 7 is so constructed that an outer housing wall 15 is watertightly combined with an inner wall 16 into one-piece double wall construction. The outer wall 15 exposed to the elements is made up of weather resistant synthetic resin, and the inner wall 16 is made of transparent synthetic resin so as to provide an easy sight of the residual amount of fuel in the fuel tank.

Figure 2:
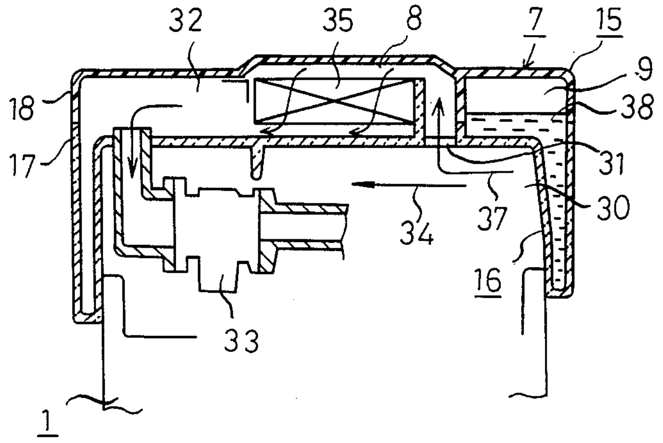
FIG. 2 is a sectional view taken along line II—II in FIG. 1.

As shown in FIG. 2, in a cooling air passage 30 within the fan housing 7 is placed an inlet 31 to the air cleaner 8, and an exit 32 from the air cleaner 8 is led to a combustion chamber or chambers (not shown) via a carburetor 33. The inlet 31 to said air cleaner chamber 8 is so arranged that the air to the air cleaner chamber is turned at right angles with the engine cooling air 34 flowing through this part. Numeral 35 is a cleaner element placed in the air cleaner chamber 8.

In FIG. 1, when the recoil starter 10 drives the driven pulley 4 to start the engine, the engine cooling fan 3 produces engine cooling air 34 flowing from the engine cooling air intake openings around the starter 10 into the periphery of cylinders 36 of the engine body 1 to cool the cylinder 36, when, as shown in FIG. 2, part of the engine cooling air 34 is drawn in the air cleaner chamber 8 as combustion air 37 and led to the carburetor 33.

As mentioned above, the nearly circular cylindrical construction of the wall as the cooling air flow passage 50, into which the outer wall 15 of the fan housing 7 is integrated with the inner wall 16, provides not only a strength enough to install the recoil starter subject to a considerably vigorous external force directly in said air passage, even if the fan housing and the air passage wall are made up of synthetic resin, but also a space enough to accommodate the recoil starter having a considerable length in the axial direction, thereby eliminating the need for an additional installation of the starter case. With vertical engines according to the invention, a nearly flush top surface of the engine with little differences in surface levels has the benefit of helping sweep away hay spattered on.

As shown in FIG. 2, the arrangement of the air cleaner chamber 8 in the fan housing 7 permits the fan housing 7 to serve also as a muffling duct, thereby minimizing the sound level of engine intake air. And also the integration of the fan housing 7 with the air cleaner chamber 8 and the fuel tank 9 remarkably reduces the number of parts required.

In addition, as shown in FIG. 2, the arrangement of the inlet 31 to the air cleaner chamber 8 at right angles with the flow of the engine cooling air 34 involves an abrupt change in the combustion air flow direction (at said inlet 31 of the combustion air 37 drawn into the air cleaner chamber 8) at right angles with the engine cooling air 34. In other words, the dust entrained in the combustion air 37 is separated away due to the effect of direction change, thereby minimizing inclusion of dust into the flow to the engine combustion chamber (not shown).

Figure 3:
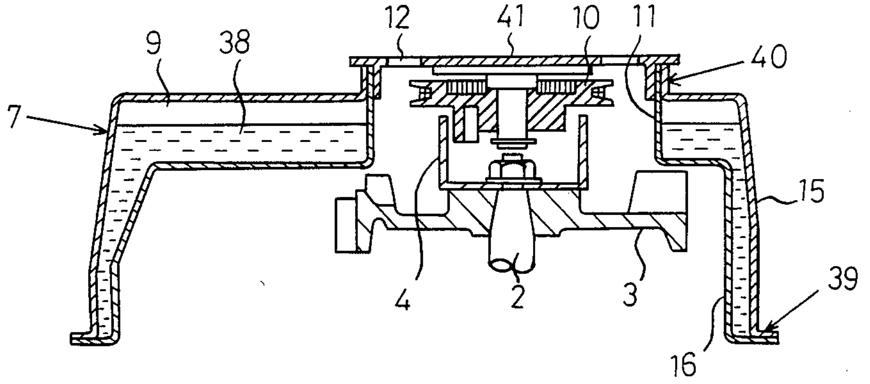
FIG. 3 is a side sectional view showing another embodiment of a fan housing according to the invention along with a cooling fan and a recoil starter.

FIG. 3 is another embodiment of a fan housing according to the invention. The fan housing 7 illustrated in this example is also made up of the double wall construction, excepting that the housing outer wall 15 and the housing inner wall 16 are made of sheet metal, and the respective outer flange 39 and inner flange 40 are seam welded all around for water tightness, thus using the hollow space between the walls as a fuel tank 9. Numeral 41 is a base for the recoil starter 10, which is disconnectably secured by screws (not shown) on the outer opening of the starter case 11 or said inner flange 40. In FIG. 3 compared together with FIG. 1, like reference characters denote like parts.

With aforesaid embodiments, a right circular cylinder is employed as the shape of the cooling air passage. However, the shape is not necessary limited to a right circular cylinder, but a cone or other similar shape may be used.

What is claimed is:

1. A fan housing to cover an engine cooling fan mounted on an engine output shaft, which is of a double wall construction around an engine cooling air passage, with the inner space of the double wall serving as a fuel tank, wherein said cooling air intake passage is made up of a nearly circular cylindrical wall which extends in the direction of the engine output shaft and terminates integrally into the outer and inner walls of the fan housing at both ends, as well as wherein a recoil starter is directly installed concentrically with the engine output shaft.

2. The fan housing as claimed in claim 1 wherein an air cleaner chamber is arranged in the double wall construction on a side of said cooling air intake passage.

* * * * *